(12) United States Patent
Baust et al.

(10) Patent No.: US 9,682,709 B2
(45) Date of Patent: Jun. 20, 2017

(54) METHOD AND DEVICE FOR DETECTING A CRITICAL SNAKING MOTION OF A TRAILER OF A VEHICLE COMBINATION

(71) Applicant: Robert Bosch GmbH, Stuttgart (DE)

(72) Inventors: Benjamin Baust, Freiberg/Neckar (DE); Markus Beisswenger, Schwaebisch Hall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/732,254

(22) Filed: Jun. 5, 2015

(65) Prior Publication Data

US 2015/0353096 A1 Dec. 10, 2015

(30) Foreign Application Priority Data

Jun. 5, 2014 (DE) .................. 10 2014 210 801

(51) Int. Cl.
*B60W 40/114* (2012.01)
*B60T 7/20* (2006.01)
*B62D 13/00* (2006.01)

(52) U.S. Cl.
CPC ............ *B60W 40/114* (2013.01); *B60T 7/20* (2013.01); *B62D 13/00* (2013.01); *B62D 13/005* (2013.01); *B60T 2230/06* (2013.01); *B60W 2520/14* (2013.01)

(58) Field of Classification Search
CPC . B60T 8/1708; B60T 7/12; B60T 7/20; B60G 17/0161; B60W 40/114; B60W 2520/14; B62D 13/005; B62D 13/00
See application file for complete search history.

(56) References Cited

U.S. PATENT DOCUMENTS

| 8,010,253 | B2* | 8/2011 | Lundquist | B62D 6/003 180/443 |
| 2005/0065694 | A1* | 3/2005 | Nenninger | B60T 8/1708 701/70 |
| 2006/0149444 | A1* | 7/2006 | Schindler | B60G 17/0161 701/37 |
| 2008/0033612 | A1* | 2/2008 | Raab | B60T 7/12 701/38 |
| 2008/0172163 | A1* | 7/2008 | Englert | B60T 7/20 701/83 |
| 2008/0189016 | A1* | 8/2008 | Bernzen | B60R 21/013 701/46 |
| 2009/0228182 | A1* | 9/2009 | Waldbauer | B60T 8/1708 701/70 |
| 2010/0241319 | A1* | 9/2010 | Choby | B60T 7/20 701/48 |

FOREIGN PATENT DOCUMENTS

DE   199 64 048   1/2001

\* cited by examiner

*Primary Examiner* — Basil T Jos
(74) *Attorney, Agent, or Firm* — Gerard Messina

(57) ABSTRACT

A method is provided for the detection of a critical snaking motion of a trailer of a vehicle combination, in which a setpoint yaw rate of the trailer is ascertained from the transverse acceleration of the trailer and the longitudinal speed of the vehicle combination, the actual yaw rate of the trailer is ascertained using a yaw rate sensor, and by a comparison of the curve over time of the setpoint yaw rate and the actual yaw rate, the presence of a critical snaking motion of the trailer is ascertained.

14 Claims, 1 Drawing Sheet

METHOD AND DEVICE FOR DETECTING A CRITICAL SNAKING MOTION OF A TRAILER OF A VEHICLE COMBINATION

BACKGROUND INFORMATION

A method and a device for stabilizing a road vehicle, particularly a passenger car, having a trailer pulled by the road vehicle, are known from German Published Application No. 199 64 048 A1, the road vehicle being monitored with respect to snaking motions, and upon detection of a snaking motion, a yaw moment, that is essentially in phase opposition to the snaking motion, being impressed automatically on the road vehicle.

SUMMARY

The present invention relates to a method for the detection of a critical snaking motion of a trailer of a vehicle combination, in which
- a setpoint yaw rate of the trailer is ascertained from the transverse acceleration of the trailer and the longitudinal speed of the vehicle combination
- the actual yaw rate of the trailer is ascertained using a yaw rate sensor, and
- by a comparison of the curves over time of the setpoint yaw rate and the actual yaw rate, the presence of a critical snaking motion of the trailer is ascertained.

This makes it possible to ascertain a snaking motion of a trailer based purely on trailer sensor means.

One advantageous embodiment of the present invention is characterized in that a critical snaking motion is detected as present if the phase shift of the curve oscillating with time of the setpoint yaw rate relative to a curve oscillating with time of the actual yaw rate exceeds a specified threshold value.

One further advantageous embodiment of the present invention is characterized in that a critical snaking motion is detected as being present if the difference in amplitude between a curve oscillating with time of the setpoint yaw rate and a curve oscillating with time of the actual yaw rate exceeds a specified threshold value at a specified time after the beginning of the oscillations. Both the phase difference and the amplitude difference are easy to ascertain computationally in a control unit.

One advantageous embodiment of the present invention is characterized in that a critical snaking motion is detected as present if the growth rate of the of the amplitude difference between a curve oscillating with time of the setpoint yaw rate and a curve oscillating with time of the actual yaw rate exceeds a specified threshold value. By growth rate one should understand the increase in the amplitude per unit of time.

One advantageous embodiment of the present invention is characterized in that, in the case of an ascertained critical snaking motion of the trailer, driver-independent braking and/or steering and/or engine torque-reducing interventions take place on the towing vehicle. These interventions are easily carried out, for instance, using a driving dynamics regulating system that is available on the towing vehicle.

One advantageous embodiment of the present invention is characterized in that, in the case of an ascertained critical snaking motion of the trailer, a driver-independent braking intervention takes place on the trailer.

One advantageous embodiment of the present invention is characterized in that, in the case of an ascertained critical snaking motion of the trailer, and if, in addition, using sensor means mounted on the towing vehicle, a non-presence of a critical snaking motion of the towing vehicle is ascertained, information on the snaking motion of the trailer is transmitted to the driver, but a driver-independent braking and/or steering and/or engine torque intervention on the towing vehicle, for stabilizing the trailer, does not take place. This avoids sacrificing comfort for the driver by a stabilization intervention. At the same time, however, the driver is given the opportunity of stabilizing the trailer by a reduction in the vehicle speed.

One advantageous embodiment of the present invention is characterized in that the ascertainment of the transverse acceleration as well as the actual yaw rate of the trailer take place by sensor means mounted on the trailer.

In addition, the present invention includes a device having means designed for implementing the method according to the present invention. This is in particular a control unit in which the program code for carrying out the method according to the present invention is stored.

DETAILED DESCRIPTION

Based on the measured trailer transverse acceleration, a setpoint yaw rate of the trailer may be ascertained using the longitudinal speed. This may be done with the aid of the mathematical relationship vGisetpoint=ay/v, where vGisetpoint is the setpoint yaw rate, ay is the measured trailer transverse acceleration and v is the longitudinal speed of the vehicle combination.

This value may be compared to the measured actual yaw rate of the trailer. The phase shift between the two signals gives a measure for the intensity of the trailer's snaking motion.

Figure 1:
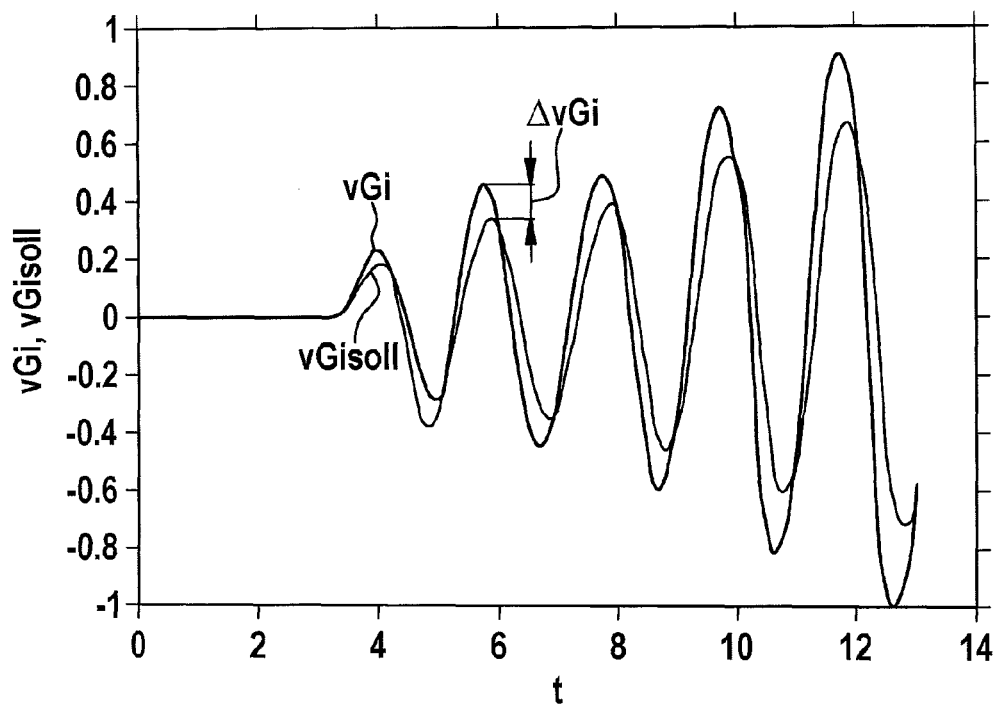
FIG. 1 shows the curve over time of the actual yaw rate and the setpoint yaw rate for a stable slalom travel of a towing vehicle having a trailer.
Figure 2:
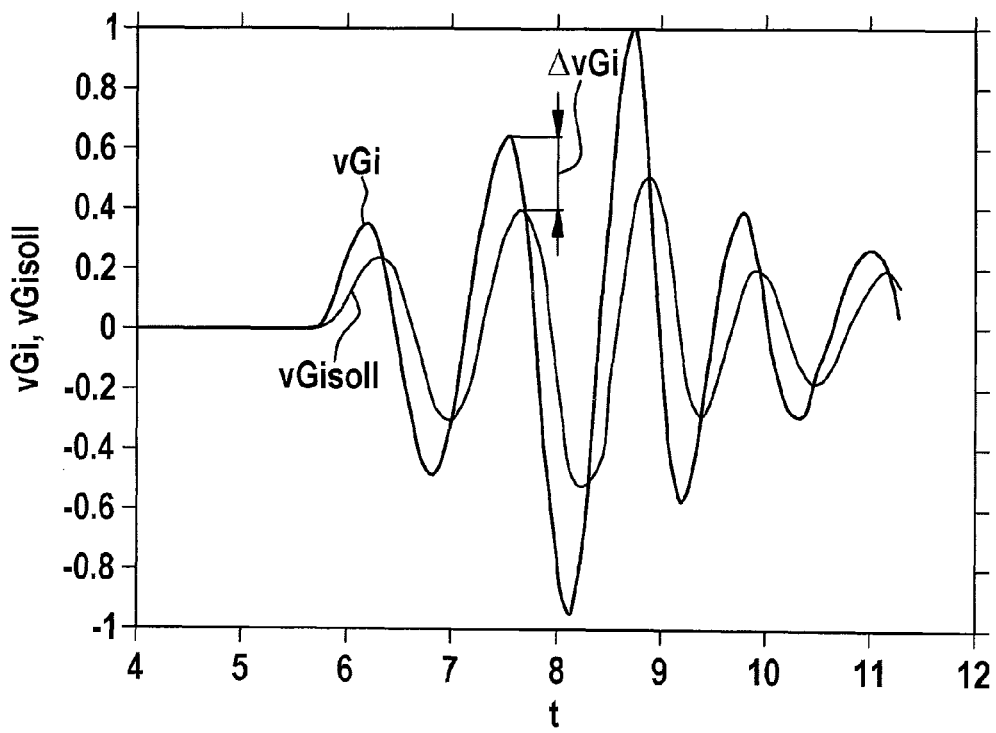
FIG. 2 shows the curve over time of the actual yaw rate and the setpoint yaw rate for a snaking motion of the trailer that is taking place, and its stabilization using a braking intervention.

In the following, this process is elucidated with the aid of FIGS. 1 and 2. In those figures, respectively time t is plotted in the abscissa direction and the setpoint value vGisetpoint and the actual value vGi of the yaw rate in the ordinate direction. vGi and vGisetpoint are each normalized values, the normalization being the same in both diagrams. FIG. 1 shows the curve over time of the values at a stable slalom travel of the vehicle combination, and in FIG. 2 there exists a trailer snaking motion. A comparison of FIG. 1 and FIG. 2 shows that in a stable slalom travel the amplitude difference between the setpoint yaw rate and the actual yaw rate is less and grows more slowly than in the case of a snaking motion of the trailer. This becomes clear in the figures by drawing in the difference ΔvGi between the setpoint yaw rate and the actual yaw rate. Approximately at time t=9, in FIG. 2, there occurs a braking intervention on the towing vehicle that stabilizes the snaking motion of the trailer. As a result, the setpoint yaw rate and actual yaw rate of the trailer subside again rapidly. Furthermore, it becomes clear from the figures that the phase shift between the setpoint yaw rate and the actual yaw rate is smaller during a stable slalom travel than in the event of a snaking trailer.

A combination with a stabilization system based, for example, on a driver-independent steering and/or braking and/or engine torque interventions, allows for the following scenarios:
1) The trailer snakes, but the towing vehicle demonstrates no significant snaking motion: This scenario occurs predominantly when coupling a small trailer to the towing vehicle. In this case, a warning to the driver is frequently sufficient for him to be able to stabilize by a speed reduction. This warning may take place by a light or by information on the instrument panel, for example.
2) Both the trailer and the towing vehicle are snaking: In this case, an early activation of driver-independent braking, engine torque and/or steering interventions on the towing vehicle are expedient. In addition, the braking system of the trailer or a stabilizing ball clutch may further be actuated.

What is claimed is:

1. A method for detecting a critical snaking motion of a trailer of a vehicle combination, the method comprising:
    ascertaining, via a sensor, a setpoint yaw rate of the trailer from a transverse acceleration of the trailer and a longitudinal speed of the vehicle combination;
    ascertaining, via the sensor, an actual yaw rate of the trailer using a yaw rate sensor;
    ascertaining, via a control unit, a presence of the critical snaking motion of the trailer by comparing a curve over time of the setpoint yaw rate and a curve over time of the actual yaw rate; and
    implementing, in the case of ascertaining the critical snaking motion of the trailer, a driver-independent braking intervention on the trailer;
    wherein the critical snaking motion is detected as present by performing at least one of the following:
        if a phase shift of the curve oscillating with time of the setpoint yaw rate relative to the curve oscillating with time of the actual yaw rate exceeds a specified threshold value,
        if an amplitude difference between the curve oscillating with time of the setpoint yaw rate and the curve oscillating with time of the actual yaw rate exceeds a specified threshold value at a specified time after a beginning of the oscillations, and
        if a growth rate of an amplitude difference between the curve oscillating with time of the setpoint yaw rate and the curve oscillating with time of the actual yaw rate exceeds a specified threshold value.

2. The method as recited in claim 1, wherein the critical snaking motion is detected as present, if a phase shift of the curve oscillating with time of the setpoint yaw rate relative to the curve oscillating with time of the actual yaw rate exceeds the specified threshold value.

3. The method as recited in claim 1, wherein the critical snaking motion is detected as present, if an amplitude difference between the curve oscillating with time of the setpoint yaw rate and the curve oscillating with time of the actual yaw rate exceeds the specified threshold value at the specified time after the beginning of the oscillations.

4. The method as recited in claim 1, wherein the critical snaking motion is detected as present, if a growth rate of an amplitude difference between the curve oscillating with time of the setpoint yaw rate and the curve oscillating with time of the actual yaw rate exceeds the specified threshold value.

5. The method as recited in claim 1, further comprising:
    transmitting, via the control unit, in the case of an ascertained critical snaking motion of the trailer, if a non-presence of the critical snaking motion of the towing vehicle is ascertained using a sensor mounted on the towing vehicle, information on the snaking motion of the trailer to a driver, wherein none of at least one of a driver-independent braking intervention, a driver-independent steering intervention, and a driver-independent engine torque-reducing intervention takes place.

6. The method as recited in claim 1, wherein the ascertaining of the transverse acceleration and the ascertaining of the actual yaw rate of the trailer are performed by the sensor, which is mounted on the trailer.

7. A method for detecting a critical snaking motion of a trailer of a vehicle combination, the method comprising:
    ascertaining, via a sensor, a setpoint yaw rate of the trailer from a transverse acceleration of the trailer and a longitudinal speed of the vehicle combination;
    ascertaining, via the sensor, an actual yaw rate of the trailer using a yaw rate sensor;
    ascertaining, via a control unit, a presence of the critical snaking motion of the trailer by comparing a curve over time of the setpoint yaw rate and a curve over time of the actual yaw rate; and
    implementing, in the case of ascertaining the presence of the critical snaking motion of the trailer, on the towing vehicle at least one of a driver-independent braking intervention, a driver-independent steering intervention, and a driver-independent engine torque-reducing intervention;
    wherein the critical snaking motion is detected as present by performing at least one of the following:
        if a phase shift of the curve oscillating with time of the setpoint yaw rate relative to the curve oscillating with time of the actual yaw rate exceeds a specified threshold value,
        if an amplitude difference between the curve oscillating with time of the setpoint yaw rate and the curve oscillating with time of the actual yaw rate exceeds a specified threshold value at a specified time after a beginning of the oscillations, and
        if a growth rate of an amplitude difference between the curve oscillating with time of the setpoint yaw rate and the curve oscillating with time of the actual yaw rate exceeds a specified threshold value.

8. A device for detecting a critical snaking motion of a trailer of a vehicle combination, comprising:
    a sensor for ascertaining a setpoint yaw rate of the trailer from a transverse acceleration of the trailer and a longitudinal speed of the vehicle combination, and for ascertaining an actual yaw rate of the trailer using a yaw rate sensor; and a control unit for ascertaining a presence of the critical snaking motion of the trailer by comparing a curve over time of the setpoint yaw rate and a curve over time of the actual yaw rate;
    wherein the control unit implements, in the case of ascertaining the critical snaking motion of the trailer, a driver-independent braking intervention on the trailer, and
    wherein the critical snaking motion is detected as present by performing at least one of the following:
        if a phase shift of the curve oscillating with time of the setpoint yaw rate relative to the curve oscillating with time of the actual yaw rate exceeds a specified threshold value,
        if an amplitude difference between the curve oscillating with time of the setpoint yaw rate and the curve oscillating with time of the actual yaw rate exceeds a specified threshold value at a specified time after a beginning of the oscillations, and if a growth rate of an amplitude difference between the curve oscillating with time of the setpoint yaw rate and the curve oscillating with time of the actual yaw rate exceeds a specified threshold value.

9. The device as recited in claim 8, wherein the critical snaking motion is detected as present, if a phase shift of the curve oscillating with time of the setpoint yaw rate relative to the curve oscillating with time of the actual yaw rate exceeds the specified threshold value.

10. The device as recited in claim 8, wherein the critical snaking motion is detected as present, if an amplitude difference between the curve oscillating with time of the setpoint yaw rate and the curve oscillating with time of the actual yaw rate exceeds the specified threshold value at the specified time after the beginning of the oscillations.

11. The device as recited in claim 8, wherein the critical snaking motion is detected as present, if a growth rate of an amplitude difference between the curve oscillating with time of the setpoint yaw rate and the curve oscillating with time of the actual yaw rate exceeds the specified threshold value.

12. The device as recited in claim 8, wherein the control unit transmits, in the case of an ascertained critical snaking motion of the trailer, if a non-presence of the critical snaking motion of the towing vehicle is ascertained using a sensor mounted on the towing vehicle, information on the snaking motion of the trailer to a driver, wherein none of at least one of a driver-independent braking intervention, a driver-independent steering intervention, and a driver-independent engine torque-reducing intervention takes place.

13. The device as recited in claim 8, wherein the ascertaining of the transverse acceleration and the ascertaining of the actual yaw rate of the trailer are performed by the sensor, which is mounted on the trailer.

14. A device for detecting a critical snaking motion of a trailer of a vehicle combination, comprising:

a sensor for ascertaining a setpoint yaw rate of the trailer from a transverse acceleration of the trailer and a longitudinal speed of the vehicle combination, and for ascertaining an actual yaw rate of the trailer using a yaw rate sensor; and a control unit for ascertaining a presence of the critical snaking motion of the trailer by comparing a curve over time of the setpoint yaw rate and a curve over time of the actual yaw rate;

wherein the control unit implements, in the case of ascertaining the presence of the critical snaking motion of the trailer, on the towing vehicle at least one of a driver-independent braking intervention, a driver-independent steering intervention, and a driver-independent engine torque-reducing intervention, and wherein the critical snaking motion is detected as present by performing at least one of the following:

if a phase shift of the curve oscillating with time of the setpoint yaw rate relative to the curve oscillating with time of the actual yaw rate exceeds a specified threshold value, if an amplitude difference between the curve oscillating with time of the setpoint yaw rate and the curve oscillating with time of the actual yaw rate exceeds a specified threshold value at a specified time after a beginning of the oscillations, and if a growth rate of an amplitude difference between the curve oscillating with time of the setpoint yaw rate and the curve oscillating with time of the actual yaw rate exceeds a specified threshold value.

* * * * *